United States Patent [19]

Jones et al.

[11] Patent Number: 5,035,910
[45] Date of Patent: Jul. 30, 1991

[54] SEPARATION OF OILSEED COMPONENTS IN SOLVENT PHASE

[75] Inventors: John D. Jones, Ottawa; Douglas S. McGinnis, Lacombe, both of Canada

[73] Assignee: Her Majesty the Queen in right of Canada, as represented by the Minister of Agriculture, Ottawa, Canada

[21] Appl. No.: 480,021

[22] Filed: Feb. 14, 1990

[51] Int. Cl.$^5$ ............................................. H23L 1/20
[52] U.S. Cl. ........................ 426/478; 260/412.2; 260/412.3; 260/412.4; 426/417; 426/489
[58] Field of Search ............ 260/412.2, 412.3, 412.4; 426/417, 478, 489

[56] References Cited

U.S. PATENT DOCUMENTS

| | | | |
|---|---|---|---|
| 3,402,165 | 9/1968 | Bock | 260/412.3 |
| 3,542,559 | 11/1970 | Goodban et al. | 260/412.4 |
| 3,615,657 | 10/1971 | Gastrock | 426/430 |
| 3,732,108 | 5/1973 | Eapen et al. | 260/412.2 |
| 3,816,389 | 6/1974 | Mihara et al. | 426/417 |
| 3,972,861 | 8/1976 | Gardner, Jr. et al. | 426/430 |
| 4,008,210 | 2/1977 | Steele et al. | 260/412.4 |
| 4,139,646 | 2/1979 | Gastrock | 426/430 |
| 4,146,534 | 3/1979 | Armstrong | 530/378 |
| 4,453,832 | 6/1984 | Schumacher et al. | 366/167 |

FOREIGN PATENT DOCUMENTS 1089849 11/1980 Canada .

Primary Examiner—Donald E. Czaja
Assistant Examiner—D. Workman
Attorney, Agent, or Firm—Alan A. Thomson

[57] ABSTRACT

Oilseed, particularly whole canola seed, is separated under non-oxidizing conditions, in a non-aqueous solvent system, into high quality oil and proteinaceous flour food components, and a seed coat meal (hull) byproduct. Maceration in a solvent, sequential liquid cyclone separations, and recovery of components and solvent all take place in completely enclosed liquid flow-through systems with solvent recycle, in a relatively short time. This rapid processing avoids oilseed exposure to elevated temperatures and substantially prevents breakdown of certain of its chemical components into antinutritional compounds. Flaking, cooking and pressing stages are not required.

15 Claims, 5 Drawing Sheets

PARTICLE-SIZE DISTRIBUTION OF PROTEIN-RICH FLOUR OBTAINED FROM CYCLONE SYSTEM OVERFLOW.

PARTICLE-SIZE DISTRIBUTIONS FOR PROTEIN-RICH
FLOUR AND HULL MEAL FROM CYCLONE SYSTEM

SEPARATION OF OILSEED COMPONENTS IN SOLVENT PHASE invention concerns the separation of oil, protein flour and seed coat meal from whole intact oilseeds by rapid processing in a liquid solvent phase. A combination of liquid cyclone separators are arranged and operated to effect the basic separations. Oilseeds of the Brassica family are of primary concern, particularly rapeseed or canola, and mustard. Varieties of flax and poppy seed also would be suitable.

BACKGROUND AND PRIOR ART

Canola rapeseed cultivars low in erucic acid and glucosinolates, have become the most important oilseed crop in Canada, and are an important source of edible oil throughout the world. The oil, which constitutes about 40% of the seed, is used for a variety of food products including salad oils, cooking oils and hydrogenated products such as margarines and shortenings. In 1988, oil derived from canola accounted for approximately 56% of Canada's vegetable oil supply. It ranked third among the world's oilseed crops, and was second only to wheat in Canada in terms of farm value and area planted. While not presently used for human consumption, canola flour is a very good source of protein, containing an excellent balance of essential amino acids. Canola meal contributes up to 30% of the animal feed protein used in Canada. This protein, which is about 27% of the canola seed, has performed very well experimentally in combination with other foods, such as ground meat, baking flour, and egg albumen. Canola, or "Low Erucic Acid Rapeseed" (LEAR) oil received "Generally Recognized as Safe" (GRAS) status in the United States on 28 January 1985.

Present methods for the extraction of oil from canola involve mechanical pressure to directly press oil from the seed, and/or direct solvent extraction using hexane. The most frequently employed process uses a combination of these two methods, and is referred to as prepress-solvent extraction (PSE). In this process, clean seed is crushed or flaked to rupture the oil-bearing cells. The flaking of the seeds also allows them to be heated for 30-40 minutes in a series of cooking kettles (stack cooker) used in the cooking operation which follows. Cooking at 80-100° C. for about 30 minutes is done for two principal reasons: (1) it is believed that heat treatment conditions the cell walls so as to allow more rapid extraction of the oil, increasing the permeability of the seed to the hot miscella (oil+hexane); and (2) it destroys seedborne enzymes, and in particular myrosinases, which catalyze the breakdown of glucosinolates into the deleterious compounds isothiocyanates, nitriles, oxazolidinethiones, and sulfate and thereby yielding crude oil high in sulfur. After the flaking and cooking operations, the seed meal is passed to an expeller or screw press which squeezes about 60% of the seed oil from the meal, and the residue is referred to as "oil cake". This cake is subsequently ground and conveyed to a solvent extractor, leaving the resulting meal in a solvent-saturated condition. Solvent is recovered from both the meal and miscella by toasting and distillation, leaving a crude oil for further refinement and a meal containing approximately 33% hull material.

The current processing method suffers several drawbacks, these being related to the quality of the oil and meal and products. The hull material in the meal fraction contributes little or no nutrition, and is a problem in the feeding of monogastric animals and poultry because it limits the quantity of meal that can be used in feed formulations, due to the excessive fiber content. The black hull material in the meal makes it visually undesirable as a potential ingredient in foods for human consumption and for pet foods.

The heat treatment (cooking operation; 80-100° C.) has a deleterious effect on both the oil and meal. Protein in the meal is extensively denatured, essential amino acids (e.g. lysine) are partially destroyed, and certain physical properties of the protein (e.g. color, water solubility) important in food formulations, are adversely affected. Dark and stable melanine-like compounds are produced under heat conditions from the interaction of phenols, carbohydrates and protein. Oil extracted from the heat treated, flaked seed is considerably darker than that obtained from cold-pressed seed, and is of appreciably lower quality, especially where green seed is involved.

Several patents have described certain oilseed processing involving liquid cyclones.

U.S. Pat. No. 3,615,657 (E.A. Gastrock et al), is specific for the preparation of protein concentrates low in gossypol from cottonseed. The gossypol is contained in pigment glands which if ruptured release the gossypol thereby permitting it to combine with lysine in the protein. The patent describes procedures adopted to retain the pigment glands intact and subsequently after releasing them from the matrix by a wet milling process in hexane, separating them from the protein containing particles by a liquid cyclone process.

U.S. Pat. No. 3,972,861 (H.A. Gardner et al) closely resembles Gastrock et al where the basic problem exists of retaining the pigment glands intact and their separation in a liquid cyclone is undertaken. Prior drying of the meats and method of comminution of the meats are both critical factors in the Gastrock et al patent.

U.S Pat. No. 4,146,534 (D.J. Armstrong) is based on the premise that the protein in vegetative protein sources (oilseeds) is located in discrete particles called protein bodies possessing a smooth texture and being mostly smaller than 10 microns in size. The strategy is to break up the tissue fine enough so that the protein bodies are released from the vegetative debris. The finely ground vegetative material may be subjected to a preliminary separation by air classification and the finest particle fraction preferably 60% of which has particle sizes of 10 microns or less is then subjected to a separation in hydrocyclones after suspension in water or aqueous-alcohol having a low protein solubility. The protein bodies are concentrated in the underflow fraction and may be further subjected to a cylcone separation or recovered directly. The overflow fraction is denuded of protein bodies and enriched with vegetative debris. The overall effect of the cyclones is to yield a protein enriched fraction and a protein denuded fraction.

Canadian Patent 1,089,849, Nov. 18, 1980, F.W. Sosulski et al describes fractionating rapeseed (or mustard) by steps which can include a liquid cyclone separation of seed meal flour from hulls.

Some effort has been made to solvent extract oilseeds in a contained system.

U.S Pat. No. 4,453,832 (H.O. Schumacher et al) describes the apparatus used in a system for mixing solid material to be extracted with an extractant with provision to limit the access of atmospheric oxygen to the process, and with containment of the extractant (solvent) vapors from reaching the atmosphere. The apparatus is particularly suitable for the extraction of oilseeds when using a solvent such as hexane. This apparatus does not operate as a cyclone system and does not use means to separate hulls from the meal or from the meats solids.

None of the prior processes have provided a continuous flow process from intact seed through to final oil, flour and seed coat meal under non-oxidizing conditions.

In summary, many desirable improvements over the present processing methods for the production of oilseed (especially canola) meal and oil have been identified: (1) reduction of seed coat (hull) material in oilseed meal to upgrade the protein content and extend its utilization potential (i.e. to humans and monogastric animals); (2) reduction in the loss of nutritional factors in the meal and improvement in meal quality; (3) improved oil quality; (4) removal of antinutritional factors from meal and oil; (5) improved plant safety; (6) reduction of hexane loss from process equipment; and (7) the operation is achieved at ambient temperature. Other potential improvements to the current technology include: (8) markedly reduced process time, thereby reducing the possibility of interaction between seed components (e.g. polysaccharide/amino acid interactions; melanine compounds); (9) increased flexibility in terms of plant expansion or contraction; (10) ability to operate in a fully continuous mode; (11) reduction in the number of unit operations required to produce high quality product; and (12) simplification of the equipment, especially that used in extraction.

We have observed that when rapeseed (canola) is subjected to particle size reduction in liquids, the seed coat (hull) resists pulverization, and this factor can be used to assist separation of the seed coat from the seed endosperm which readily pulverizes under these conditions. This led us to consider continuous whole oilseed processing in a liquid system.

SUMMARY OF THE INVENTION

This invention includes a process for separating oilseeds into high quality oil, and protein-rich flour components, and a fibrous seed coat meal (hull) component comprising:
(a) slurrying intact clean oilseeds with a non-aqueous solvent which is a solvent for the oil but not for the protein and other solids present in the oilseeds,
(b) macerating the oilseeds in the slurry to powder form and dissolving the oil in the solvent,
(c) passing the macerated slurry to at least two stages of liquid cyclone separators with at least one stage being a cascade series, the initial stage being selected so that the overflow becomes concentrated in one of: the oil miscella, and the oil miscella plus protein-rich flour; while the underflow becomes concentrated in one of: protein-rich flour (mainly endosperm) plus seed coat meal (mainly hulls), and seed coat meal, respectively,
(d) passing the underflow from (c) to a second liquid cyclone separator stage, said second stage being selected so that the overflow becomes concentrated in the protein-rich flour when present or in solvent when the flour is absent; while the underflow becomes concentrated in the seed coat meal,
(e) passing the overflow from (c) to one of
  i) when protein-rich flour is present, a third liquid cyclone separator stage selected so that the overflow will become concentrated in oil miscella and the underflow in protein-rich flour, and
  ii) when protein-rich flour is absent, an oil-solvent separation stage, and
(f) recovering oil from the miscella overflow from (e)i) or from said separation stage (e)ii); protein-rich flour from the overflow from (d) or the underflow from (e)i); and fiber-rich seed coat meal from the underflow from (d).

In one preferred process, the steps comprise
(c) passing the macerated slurry to a primary cascade series of liquid cyclone separators selected so that the protein-rich seed meat and fiber-rich seed coat fragments become concentrated in the series underflow outlet stream while the oil concentration of the oil-solvent miscella is increased in the primary series overflow outlet stream, with additional solvent entering into the system countercurrently from the last cyclone inlet of the primary cyclone series,
(d) passing the seed protein-rich flour and seed coat meal underflow slurry to a secondary cascade series of liquid cyclone separators selected so that the slurry becomes concentrated with seed coat meal in the underflow stream of this series and concentrated with protein-rich seed meat flour in the overflow stream of this series, with additional solvent entering into the system countercurrently from the last cyclone inlet of the secondary series of cyclones,
(e) recovering oil and solvent from the miscella of the primary series overflow, seed coat meal from the secondary series final underflow, seed protein-rich flour from the secondary series overflow, and solvent from each of said two overflows and said final underflow, and
(f) recycling solvent to at least one of steps (a), (c) and (d).

In another preferred process, the steps comprise
(c) passing the macerated slurry to a cascade series of liquid cyclone separators as first stage selected so that the oil miscella and protein-rich flour become concentrated in the overflow stream, while the fibrous seed coat solids become enriched in the underflow stream, with additional solvent entering countercurrently from the last cyclone inlet,
(d) passing the overflow stream to a second liquid cyclone separator stage selected so that a major portion of the oil miscella becomes separated as overflow from the protein-rich flour,
(e) passing the underflow stream from (c) to a third liquid cyclone separator stage selected so that a major portion of the solvent becomes separated as overflow from the fibrous seed coat meal,
(f) separating additional oil miscella from the protein-rich flour from (d), and additional solvent from the fibrous seed coat meal from (e), and
(g) recovering the oil, the protein-rich flour and the fibrous seed coat meal; and solvent for recycling.

Preferably the process is carried out in a substantially closed system on a continuous basis. Preferably the oil recovery includes distillation separations, and the seed coat meal and protein-rich flour recovery includes centrifugal separations, in the latter steps.

The invention further includes an apparatus for separating oilseeds into high quality oil and protein-rich flour components and a seed coat meal component, comprising:
i) means for mixing intact oilseeds with a non-aqueous solvent, ii) wet mill means to macerate the oilseeds in the slurry from i) under non-oxidizing conditions, and means to feed macerated slurry to a first cyclone separation stage, iii) a first liquid cyclone separation stage selected so that the overflow becomes concentrated in one of: the oil miscella, and the oil miscella plus protein-rich flour; while the underflow becomes concentrated in one of: protein-rich flour plus seed coat meal, and seed coat meal, respectively, iv) a second liquid cyclone separation stage selected so that the overflow become concentrated in the protein-rich flour when present, or, when the flour is absent, in solvent; while the underflow becomes concentrated in the seed coat meal, v) in the case where protein-rich flour is present in the overflow from said first cyclone stage iii), a third liquid cyclone separation stage selected so that the overflow will become concentrated in oil miscella and the underflow in protein-rich flour, at least one of said cyclone separation stages comprising a cascade series of cyclones with countercurrent solvent flow, vi) means to separate oil from solvent in the miscella, and vii) means to separate solvent from the protein-rich flour and from the seed coat meal.

In one preferred embodiment the apparatus may comprise iii) a primary cascade series of a plurality of liquid cyclone separators tuned to separate miscella from solids, including means to pass the overflow from each cyclone to the next preceding cyclone and the underflow to the next following cyclone, means to feed additional solvent to the last cyclone in the series and means to pass the oil-solvent miscella overflow from the first cyclone in the primary series to an oil/solvent separation unit, said primary series cyclones being selected for optimum oil/meal separation, iv) a secondary cascade series of a plurality of liquid cyclone separators tuned to separate protein-rich seed meat flour from fibrous seed coat meal, including means to feed the solids slurry underflow from the last cyclone in the primary series to the first cyclone in the secondary series, means to pass the overflow from each cyclone to the next preceding cyclone and the underflow to the next following cyclone, means to feed additional solvent to the last cyclone in the series, means to pass the protein-rich seed meat flour slurry overflow from the first cyclone in the secondary series to a desolventizer-drier unit, and means to pass the fibrous seed coat slurry underflow from the last cyclone in the secondary series to a desolventizer-drier unit, said secondary series cyclones being selected for optimum seed meat/seed coat separation, and including viii) means to recycle solvent from said oil/solvent separation unit and said desolventizer-drier units to at least one of said mixing means i) and said primary and secondary series of cyclones iii) and iv), and ix) means to maintain the slurry contents downstream of wet mill means ii) under non-oxidizing conditions.

In another preferred embodiment the apparatus may comprise iii) a primary cascade series of a plurality of liquid cyclone separators tuned to separate protein-rich seed meat flour plus oil miscella from fibrous seed coat meal, including means to pass the overflow from each cyclone to the next preceding cyclone, and the underflow to the next following cyclone, means to feed additional solvent to the last cyclone in the series and means to pass the oil miscella and protein-rich seed meat flour overflow to a secondary liquid cyclone separator stage, and the fibrous seed coat meal underflow to a tertiary stage, iv) a secondary liquid cyclone separator stage tuned to separate a major portion of the oil miscella as overflow from the protein-rich seed meat flour, v) a tertiary liquid cyclone separator stage tuned to separate the solvent as overflow from fibrous seed coat meal, vi) means from recovering oil from the miscella overflow in iv) and for desolventizing protein-rich seed meat flour and fibrous seed coat meal, vii) means to recycle solvent from vi) to at least one of said mixing means i) and said cascade series iii), and viii) means to maintain the slurry contents downstream of wet mill means ii) under non-oxidizing conditions.

The apparatus may include an oil/solvent separation unit fed from a cyclone separator overflow. Also there may be included desolventizer-drier units for protein-rich flour or meal fed from the cyclone separator stages, preferably via totally enclosed decanter centrifuges.

DETAILED DESCRIPTION

Figure 1:
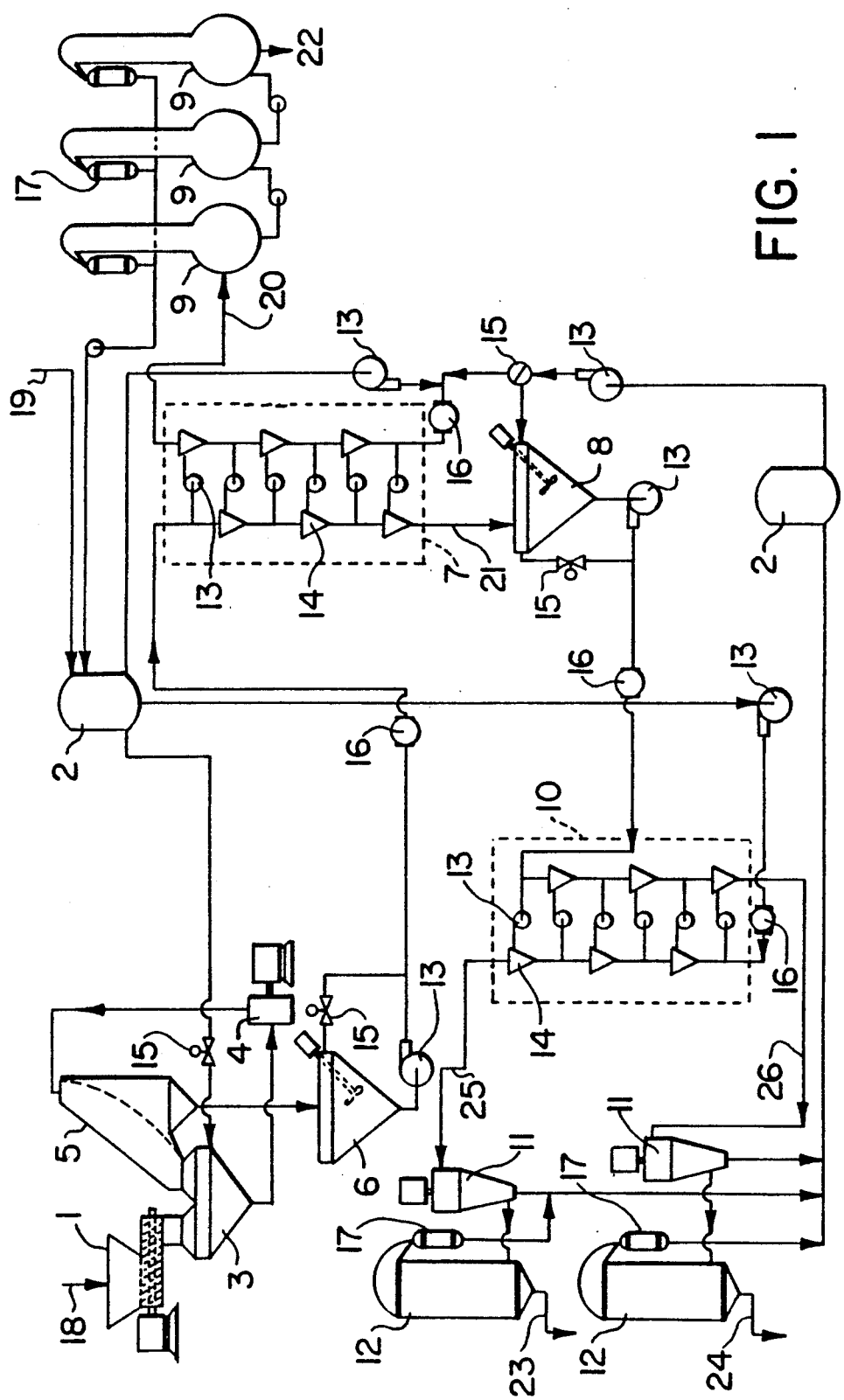
FIG. 1 is a flow diagram of a continuous separation process for producing protein-rich flour, oil and fiber-rich meal (hulls) from whole canola using two cascade series of liquid cyclones (see Example 1).

The process is applicable to any oilseed: suitable ones include rapeseed, mustard, crambe, flax and poppyseed, with Brassica species of the canola or low erucic acid rapeseed type preferred. The oilseeds should be clean, intact (as harvested) and preferably have a moisture content below about 8 wt.% based on the dried seed. Hereafter "flour" refers to protein-rich flour which is mainly endosperm particles, and "hull meal" refers to a coarse meal which is mainly seed coat particles, containing some protein flour.

The solvents are selected to dissolve the oil and be non-solvents (or poor solvents) for the protein. Examples are hydrocarbon liquids, chlorinated hydrocarbon liquids, alcohols, liquid ethers, ketones and mixtures thereof. Suitable solvents include, e.g. pentane, hexane, octane, methanol, ethanol, isopropanol, diethyl ether, methylene chloride, acetone and mixtures thereof. Hexane, methanol or ethanol are preferred. Desirably the moisture content of the solvents is kept low, e.g. below about 1 wt.%. The solvents may be recycled with, for example, ratios of recycle to total solvent ranging from about 0.8 to about 0.98.

Intact oilseeds are mixed with the selected solvent to form a free-flowing slurry, preferably of solids content from about 5 to about 15 wt/vol. An enclosed mixer such as two metered flow streams combined into a single flow in a stainless steel tube has been found effective. Optionally, to minimize fresh solvent consumption and to increase the miscella oil concentration, an optional fraction of the system overflow miscella stream may be blended with the oilseed-solvent slurry. This slurry is fed to a totally enclosed flow-through macerator which will disintegrate the seed into small particles rapidly. An enclosed macerator which has been found suitable is the three-stage Inline-Ultraturrax (TM) DR3-6/6A of Janke & Kunkel, also called Super-Dispax or Dispax Reactor DR3-6 (TM), but others are available. A single pass through this type usually has been found sufficient to reduce the seed coat particles to smaller than about 35 mesh. If two passes are found to be preferred, two macerators in series could be used, fitted with appropriate generators. Judicious selection of the generators leads to adequate reduction of the seed to the optimum particle size.

On studying the particle size distribution obtained from such macerators, we had observed that with canola seed the endosperm consistently was being broken down to a smaller average particle size than was the seed coat. The size difference between the endosperm particles and the seed coat (hull) particles was found to be consistent and significant enough to allow separation between endosperm flour and hull meal (see FIG. 4 and Example 1). There is also a density difference between endosperm and hulls (the hulls are denser: tissue densities of meats flour and hull meal were 1.26 and 1.44 g/cc respectively, as determined by helium pycnometer) and the combined size/ density differences can be exploited with liquid cyclones to achieve desired separations.

Using liquid cyclones to effect at least the bulk of the separation between miscella, endosperm flour and seed coat meal, it becomes feasible to operate a continuous, enclosed, flow-through process with minimal exposure to air or oxygen and minimal loss of solvent vapour. This continuous flow-through process operating on whole seed is the main feature of this invention. The oil and flour products have been found to have very low oxidative, enzymatic and heat degradation and to be of very high quality.

From the macerator, the macerated slurry is passed to two or more stages of liquid cyclone separators. The main stage preferably is a multi-cyclone cascade series with additional solvent flowing countercurrently from the inlet of the last cyclone in the series. The main cyclone stage is selected to accomplish the desired separation of the hulls or seed coat particles from the miscella and protein-rich flour, or from the flour if the miscella has been previously separated.

The initial cyclone separation stage is selected to separate either the miscella, or the miscella plus flour as overflow, from the total insoluble solids or the seed coat (or hull) particles as underflow, respectively. If the miscella plus flour is separated as overflow, it is preferred that this stage be a cascade series with countercurrent solvent flow. If the system is chosen so that miscella is separated from all total insoluble solids, this stage may comprise one or more cyclones, up to a cascade series.

When the miscella plus protein-rich flour is separated as overflow, this overflow can be passed to a stage of one or more liquid cyclones selected to separate the miscella as overflow from the endosperm flour as underflow, while the underflow can be passed to a cyclone stage where the hulls are separated as underflow from solvent (and minor amounts of miscella) as overflow.

When the miscella is separated as overflow in the initial cyclone stage, the underflow comprising endosperm flour and hulls is passed to a second or main stage which preferably is a cascade series of liquid cyclone separators selected so that flour will exit mainly in the overflow and hulls mainly in the underflow.

A countercurrent flow of additional solvent preferably is used in the cascade for two purposes: 1) to provide adequate dilution of the slurry to prevent plugging of the cyclone underflow discharge ports; 2) to provide maximum possible extraction capability by exposing pure solvent to meal nearest the last cyclones, having the least undissolved oil. By careful selection of the countercurrent solvent flowrate, the flow splits of the individual cyclones, and the slurry feed flowrate, the total oil recovery can be maximized subject to a maximum permissible total solvent flowrate.

One preferred system is depicted in FIG. 1 where an initial cascade series of liquid cyclones 7 separates miscella 20 from solids 21 (solids-liquid separation and leaching), and a second or main cascade series 10 separates the endosperm flour in 25 from the hull meal in 26 (i.e. classification). Referring to FIG. 1, precleaned whole seed 18 at ambient temperature is fed from hopper 1 into the mixing vessel 3 at a predetermined rate of delivery using a screw auger 1 or other suitable device. Hexane (or other solvent) from supply tank 2 via valve 15 is combined with the seed, e.g. at a solvent-/seed ratio of about 10 L/kg. The hexane-seed slurry is gravity-fed or metered to an inline, particle-reducing macerator 4 which finely divides the seed material. Hull particles are more resistant to this maceration, so that the resulting meal consist of coarse hull particles and fine protein-rich endosperm flour (meats particles). The resulting solids slurry may be passed over a screen 5 (e.g. 35 mesh sieve) to retain oversize particles (usually seed coat fragments attached to cotyledon tissue). These particles, when present, are returned to the mixing vessel 3 and remacerated. The slurry passing through this screen is gravity-fed to an agitated surge tank 6 from which it is pumped at 13 through flow control 16 into the countercurrent multicyclone extraction system 7. Pure hexane is pumped (13) via flow control 16 from storage 2 into the multicyclone system countercurrently, entering the feed input to the last (nth) of a series of liquid cyclones which comprise the multicyclone network. Each cyclone 14 in this network is fed by an individual pump (13) (e.g. non-pulsing metering pump which may be driven by a common fixed or variable speed drive system). The multicyclone network, when operated at an appropriate slurry feed flowrate, causes the insoluble-solid seed material to flow to the underflow exit of each cyclone, and ultimately to the underflow exit of the last cyclone in the series 21, while oil-bearing solvent flows to the overflow exit of each cyclone, and ultimately to the overflow exit of the first cyclone in the series; thereby achieving a rapid and effective separation of the oil from the insoluble seed solids. Oil 22 from the overflow miscella stream 20 may be recovered e.g. by distillation 9 with solvent condensers 17 as the present technology permits. The hexanemeal slurry flowing from the underflow stream of the cyclone system subsequently flows 21 into a second agitated surge tank 8. This oil-free slurry is then pumped (13) via flow control 16 into a second series of cyclones 10 which separate the fiber-rich meal (hull) and protein-rich flour fractions by countercurrent classification. The second multi-cyclone system is similar to the first except that its design and feed flowrates are such as to produce relatively high net separation efficiencies for the hull material, and low net separation efficiencies for the protein-rich flour fraction. This results in a high percentage (e.g. 95-99%) of the hull material flowing to the underflow exit of the last cyclone exit at 26, and a high percentage (e.g. 70%) of the protein flour flowing to the overflow exit of the first cyclone in this series to exit at 25. The underflow hull slurry 26 and the overflow protein-rich flour slurry 25 are each centrifuged 11 to remove most (e.g. 97%) of the hexane. The resulting hexane-saturated protein-rich flour and fiber-rich (hull) meals are stripped of residual hexane using existing desolventizer systems 12 with solvent condensers 17. Hexane from the centrifuging and desolventizing process operations is recycled for countercurrent addition to both the multicyclone extraction and classification operations make-up hexane is added as at 19. The process thus produces a high quality crude oil 22, which emerges from the last unit in a multiple-effect continuous distillation operation 9 (or process equivalent); protein-rich flour 23 essentially free from hull fragments, and a fiber-rich (hull) material 24 containing some protein. These latter products emerge from the last units in respective multiple-effect desolventizer systems 12. The rapidity at which the seed is processed into oil and protein-rich fractions results in minimal production of undesirable chemical reaction products (e.g. oil pigmentation products; browning pigmentation of protein-rich flour).

The multi-cyclone system can be configured in a second, similar countercurrent arrangement to achieve virtually the same results. In this second arrangement, e.g. as in FIG. 7, a single series of countercurrent cyclones is employed, instead of two, to achieve simultaneous oil extraction and hull-meats separation. Miscella is discharged together with the overflow protein-rich flour solids and is subsequently separated from the flour using a series combination of liquid cyclone(s) and a decanter-type centrifuge.

A range of possibilities exists regarding the dimensional characteristics of the final system design, regardless of the configuration selected. The number of stages used in the countercurrent process can vary, with the optimum number being dependent upon energy, equipment, and solvent costs, and the economic values of the flour, meal and oil products produced. Each cyclone within the flow network can be unique or identical in design. To achieve virtually any flow capacity, each cyclone stage can be made up of parallel multi-cyclone units employing common inlet and discharge manifolds. The eight independent dimensions of each cyclone must be selected to achieve the desired discharge overflow-/underflow ratio and separation efficiencies (i.e. grade efficiency curves) for the seed particles presented to it in the flow, at the design feed flowrate. Reducing the flowrate of miscella to each cyclone apex discharge orifice (with compensating flowrate increase to each cyclone overflow) will tend to improve oil separation by the countercurrent extraction system, while increasing the concentration of solids in each of the apex orifices. For this reason, these underflow orifices must be sufficiently large as to preclude the possibility of plugging. In this regard, it is recommended that the apex diameter should not be less than about 1 cm for a solids concentration of 30%, keeping in mind that the final choices of cyclone dimensions, materials, flow split, feed flowrate and feed concentration will have a bearing on plugging behaviour. Alternatively, a choking-free type of cyclone (L. Svarovsky, page 76, Hydrocyclones, Technomic Publishing Co. Inc., London, N.Y., Sydney, Toronto, 1984, loc. cit.) may be used to remove solids from the apex orifice, allowing a greater solids concentration to develop in the underflow stream.

The selection of cyclone dimensions, flowrates, and other variables to achieve the desired or optimized separations can be based on engineering principals and design procedures, but must rely on trial and error for the final result. Table 1 provides typical ranges for some of the more important cyclone variables, applicable to a wide range of applications.

TABLE 1

| Ranges for cyclone diameter and operating conditions[1] | | |
|---|---|---|
| Parameter | Range | Units |
| Inner diameter (cone base) | 10→2500 | mm |
| Cut Size[2] | 2→250 | μm |
| Flowrate | 0.1→7200 | m$^3$/h |
| Pressure drop | 0.34→6 | Bar |

[1]L. Svarovsky, 1984, op.cit.
[2]Equivalent particle diameter for which efficiency is 50%.

The performance of a single cyclone separator operating on a liquid-solid mixture, or slurry, will depend on a great many factors concerning the solid(s), the liquid(s), their mixture, the cyclone, and the operating conditions. Despite their mechanical simplicity, the engineering analysis of industrial cyclones is quite complex. Data required for engineering models include the physical properties of the liquid and solid phases, and such data usually is not readily available, and must be obtained using sophisticated instruments. The physical properties of particles of biological origin may be variable owing to such factors as storage conditions, growth variations, the possible use of chemical or physical pretreatments, and so on. The physical properties of the liquid which directly affect cyclone performance are viscosity and density. Temperature (T) and pressure (P) will influence these properties, dramatically for particular values or ranges of T and P, and these must therefore also be considered. Where multiple liquid mixtures (e.g. miscella) are involved, the proportion of each liquid will predictably influence the viscosity (or consistency) and density of the mixture. Primary particle characteristics that influence separation performance are density, porosity, shape, and size. Uniformity in the primary characteristics of the solid food particles of one type is difficult to achieve. Solid-solid separations must therefore be achieved on the basis of well defined physical differences between the two species, such that there is little or no overlap in the values of at least one property between one particle species and the other. Some fundamental concepts, considerations, and design equations are presented here to guide in the selection of the liquid cylcones. Extensive design information on cyclones (or hydrocyclones), is provided in the literature.

In the analysis of the cyclone performance, "efficiency" expresses the degree of separation of each particle type by the cyclone to the underflow. The "total efficiency" is the flow ratio of total solids (of one type) discharging with the underflow stream over that entering with the feed slurry. Because each particle is unique, and because differences between particles of one type are mainly in terms of size, the particle size distribution of each particle type is an important factor in total efficiency. The efficiency dependence on particle size (e.g. equivalent diameter) is usually expressed by the "grade efficiency", which is similar to total efficiency except that it only applies to a single particle. A well defined relationship between grade efficiency and particle size usually exists for a particular cyclone geometry, flow rate, and particle type. A plot of this relationship is often referred to as a Tromp curve or partition probability. Because a portion of the solids will be discharged strictly on the basis of the volumetric flow split of the cyclone, a "reduced" grade efficiency is used in calculations to take this into account, and is related to the grade efficiency in the following way:

$$G_r(x) = \frac{G(x) - R_f}{1 - R_f} \quad (1)$$

where
$G(x)$ = Grade Efficiency, $R_f < G(x) < 1$
$G_r(x)$ = Reduced Grade Efficiency, $0 < G_r(x) < 1$
$x$ = Particle size ($\mu$m)
$R_f$ = Volumetric flow split (Underflow/Feed)

Grade efficiency curves can be numerically predicted with reasonable accuracy, using computers, by calculating the theoretical trajectory of particles in the liquid flow field within the cyclone cavity, or they may be obtained using semi-empirical models, or by experimental results. The available models are capable of providing, at the least, a good initial estimate of cyclone performance, and these should allow a range of cyclone configurations and flow rates to be investigated. Their accuracy will depend largely on the accuracy of the physical property data used. The most reliable method for obtaining grade efficiency curves is based on direct measurement and trials using a single cyclone operating at pre-set conditions. Ideally, such trials would be carried out using available test cyclones once an estimate has been made of the optimum cyclone configuration and flow condition using engineering models. The following equation by Lynch and Rao (Studies on the operating characteristics of hydrocyclone classifiers. Indian J. Technol., 6: 106–114, 1968) has been widely accepted and is suitable as a predictive model for $G_r$:

$$G_r\left(\frac{x}{x_{50}}\right) = \frac{\exp\left(\alpha\left(\frac{x}{x_{50}}\right) - 1\right)}{\left[\exp\left(\alpha\left(\frac{x}{x_{50}}\right)\right) + \exp(\alpha) - 2\right]} \quad (2)$$

where:
$\alpha$ = empirical constant to be determined by experiment
$x_{50}$ = particle "cut size" or particle size corresponding to particle size having a $G_r$ = 0.50 (50% "reduced efficiency"), determined from experiment Different grade efficiency "targets" must be considered depending upon whether a liquid-solid separation or solid-solid separation (classification) is required. In the case of liquid-solid separation, such as is used for the extraction process, the cyclone and flow rate should be selected to maximize efficiency for the finest particle (hence all particles) subject to the selection of an economical flowrate in terms of pumping (energy) cost, and subject to a minimum separation requirement. In cases where the slurry contains a small percentage of extremely fine or light particles it may not be practical to separate these particles using cyclones, and an alternative separation method, (e.g. filtration) may be used to clarify the overflow stream. In the case of cyclone classification, it is desirable to select a cyclone configuration which achieves a steep grade efficiency curve (large slope of efficiency versus particle size curve), at the appropriate flowrate, for each of the particle types to be separated, such that for the coarse (or heavy) particles the efficiency will be greater than an optimal minimum value, while for the fine (or light) particles, the efficiency will be less than or equal to an optimal maximum value. Ideally, of course, the grade efficiency functions for both particle types would be non-identical step functions.

Figure 3:
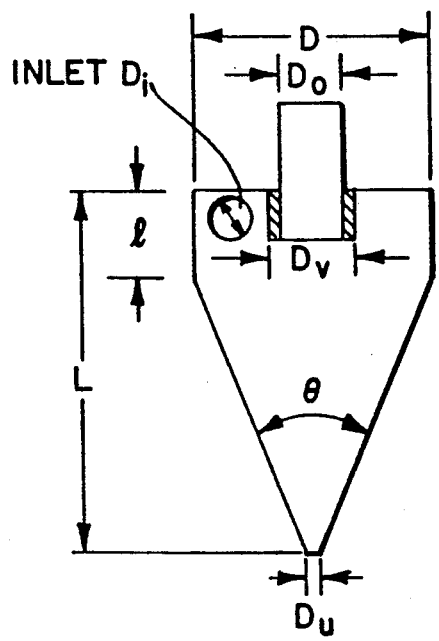
FIG. 3 is a diagram of a cyclone showing the important dimensions.

While commercially manufactured cyclones will vary in terms of materials, assembly, and special features, differences in performance characteristics between cyclones can mainly be attributed to their internal geometrical differences. The internal geometry of conventional cyclones is uniquely defined by the set of values selected for the seven independent internal cyclone dimensions shown in FIG. 3. Table 2 provides a summary of proportions and scale-up constants for some well known cyclone designs. Generally, wide-angled designs, or cyclones having a cone angle of greater than 25 degrees, are used for solids classification according to particle shape or density, while narrow-angled designs (6 < cone angle < 25°) are considered to be more suitable for separation. We prefer to select the cyclone diameter within a range of about 5 to about 10 cm for each of the separation stages herein.

The materials and construction features employed for the liquid contact surfaces of the cyclone must be carefully considered. Internal cyclone surfaces should be highly polished and free of any discontinuities, burrs, or crevices. Internal surfaces should be machined, and free of welds. Also, solvents have the ability to carry electrical charges, and consideration must be given to the ability of the construction materials and the overall flow system to safely dissipate electrical charges that can develop from contact with the solvent media. An electrical discharge (i.e. spark) could lead to a disasterous consequence in the event of a solvent leak. A stainless steel of type 316 would be ideal for the cyclone construction material. However, we found that a polyoxymethylene plastic homopolymer [Delrin (TM)] performed well as an inexpensive construction material for our prototype cyclones, with electrically grounded stainless steel tubing and tanks used within the overall flow network.

Once the cyclone design has been selected, and the grade efficiency functions for each particle type are known, it is possible to determine the particle separation performance of a countercurrent multi-cyclone system by computer analysis. Estimation of oil extraction performance of a countercurrent system which utilizes cyclones operating at 100% total efficiency (solids) can also be made by computer analysis. Two computer programs were therefore developed to predict classification and extraction performance, and these were used as design tools prior to the construction and testing of our prototype multi-cyclone system. Computer program predictions were eventually compared to physical experimental results, described later.

TABLE 2

Summary of some known cyclone designs.[1]

| cyclone type and D | *** Geometrical proportions ***** | | | | | θ (degrees) |
|---|---|---|---|---|---|---|
| | Di/D | Do/D | Du/D | l/D | L/D | |
| A. Separation | | | | | | |
| Mozley cyclone D = 0.022 m | 0.154 | 0.214 | — | 0.57 | 7.43 | 6 |
| Mozley cyclone D = 0.044 m | 0.197 | 0.32 | — | 0.57 | 7.71 | 6 |
| Bradley's design D = 0.038 m | 0.133 | 0.20 | — | 0.33 | 6.85 | 9 |
| Hi-Klone model 2 D = 0.097 m | 0.175 | 0.25 | — | 0.92 | 5.6 | 10 |
| Warman 3" model R D = 0.076 m | 0.29 | 0.20 | — | 0.31 | 4.0 | 15 |
| Rietema[2] D = 0.075 m | 0.28 | 0.34 | — | 0.4 | 5 | 20 |
| Demco D = 0.051 m | 0.217 | 0.50 | — | 1.0 | 4.7 | 25 |
| B. Classification | | | | | | |
| Rietema[2] D = variable. | 0.14 | 0.14 | — | 0.4 | 2.5 | 28 |
| Dreissen D = 0.060 m | 0.167 | 0.333 | 0.247 | — | — | 45 |
| Dreissen D = 0.060 m | 0.167 | 0.333 | 0.247 | — | — | 60 |
| Rietema D = 0.600 m | 0.083 | 0.083 | 0.013 | 0.23 | 0.53 | 160 |
| Rietema D = 0.300 m | 0.133 | 0.167 | 0.027 | — | 1.17 | 160 |

[1]Source: L. Svarovsky, 1984. Hydrocyclones. Technomic Publishing Co. Inc., London, NY, Sydney, Toronto.
[2]Optimum designs for separation and classification according to Rietema (K. Rietema, 1961. Performance and design of hydrocyclones, Parts I to IV. Chemical Engineering Science. 15: 298-325.)
Note:
Further data is provided by Svarovsky on the indicated cyclones. See FIG. 3 for explanation of dimensions.

We have found it preferable that the diameters of the liquid cyclones used to separate miscella or solvent and protein-rich flour from fibrous seed coat meal are selected within the range of about 3 to about 10 cm, and the cyclone liquid feed flowrates are chosen to cause high separation efficiencies for the hull meal, and low separation efficiencies for the protein-rich flour, with hulls predominantly flowing to the cyclone underflow exits, and flour or flour plus miscella predominantly flowing to cyclone overflow exits. Desirably, the diameters of the liquid cyclones used to separate miscella from flour and seed coat meal are selected within the range of about 3 to about 10 cm, and the cyclone feed flowrates are chosen to produce high separation efficiencies for both the seed coat and flour solids, these predominantly flowing to underflow exits, with miscella flowing to the overflow exits at rates equal to about 50% or more of the cyclone liquid feed flowrate. Most suitably the diameters of the liquid cyclones used to separate flour from seed coat meal are selected within the range of about 3 to about 10 cm and the flowrate selected for high separation of flour, which predominantly reports to overflow exits, from hulls which report to cyclone underflow exits. Preferably the characteristics of the liquid cyclone stage used to separate miscella from flour are selected from:

liquid cyclone diameter: 3 to 6 cm
flowrate: 150 to 750 ml/sec
with the diameter and flowrate tuned to optimize separation of miscella as overflow from flour. Preferably, the characteristics of the liquid cyclone stage used to separate solvent or miscella from seed coat meal are selected from:
liquid cyclone diameter: 5 to 9 cm
flowrate: 150 to 750 ml/sec
with the diameter and flowrate tuned to optimize separation of solvent or miscella as overflow from seed coat meal.

Figure 7:
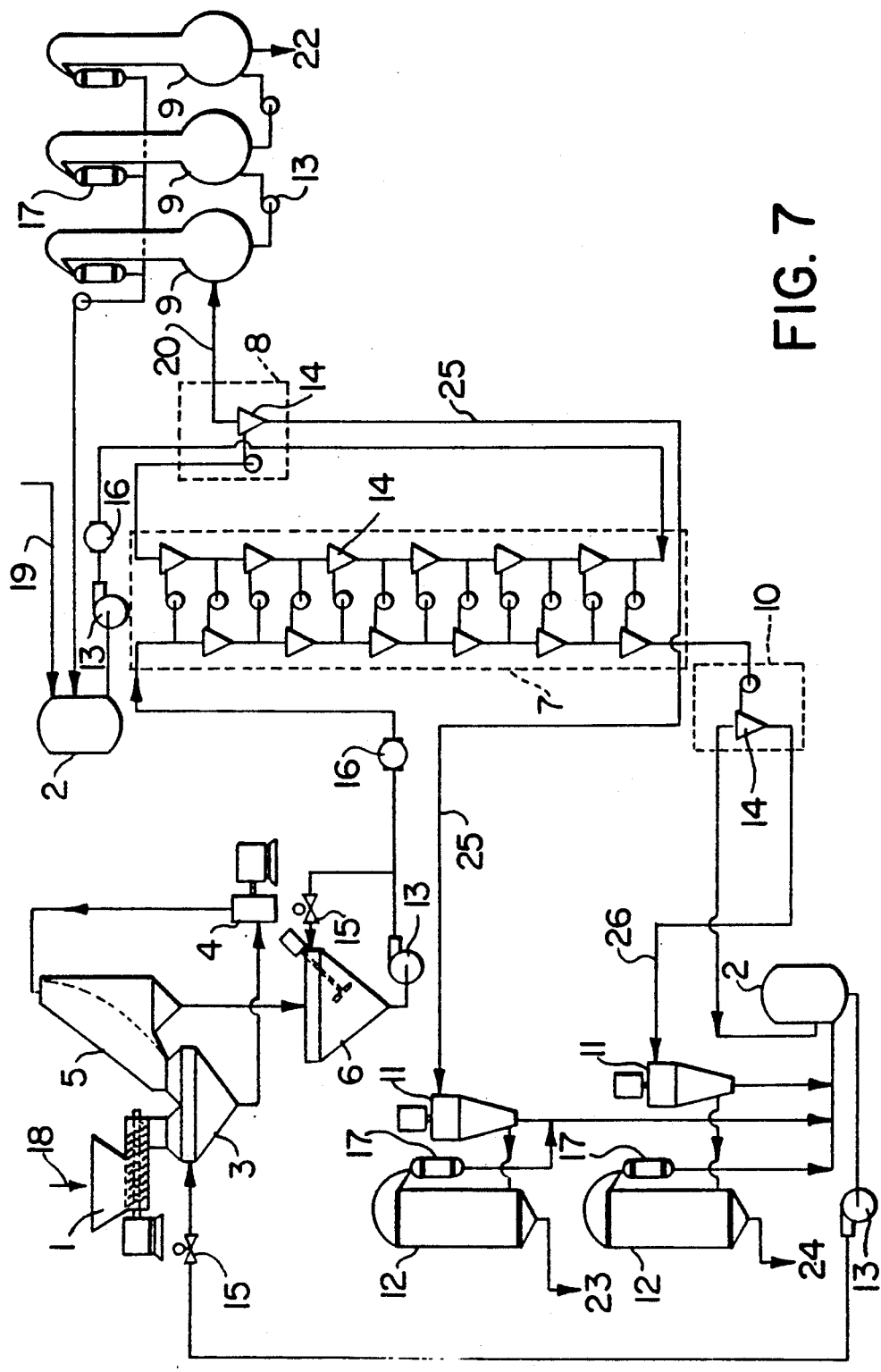
FIG. 7 is a flow diagram of a continuous three-stage (one cascade) liquid cyclone separation of oil 22, protein-rich flour 25 and 23 and fiber-rich (hull) solids (e.g. see Example 2).

The oil may be recovered from the miscella by distillation, and/or membrane separation. The oil recovery need not be complete since the solvent normally will be recycled, e.g. as shown in FIGS. 1 and 7.

The flour is desolventized by known techniques e.g. high speed decanter centrifuge followed by desolventizer-toaster systems and/or combined with solvent flash evaporators using superheated solvent to reduce the residual solvent to below about 400 ppm by wt.

The hull meal also is desolventized by similar means. This meal may be ground e.g. in a hammer or pin mill or similar device to reduce the particle size to below about 100 mesh if desired.

The protein-rich flour offers a useful and attractive protein source for feed use, possessing at least 50% protein content ($N \times 6.25$) and being of excellent quality and free from a high crude fiber content, thereby making available a most suitable feed component for non-ruminant animals and poultry. The protein-rich flour can be further processed in the same cyclone means herein described and using the process described in U.S. Pat. No. 4,158,656 and Canadian Patents 1,100,490 and 1,117,134 to yield edible protein concentrate.

The seed coat meal, or hulls, was determined (fat-free, moisture-free basis) to be about 20% protein and about 70% fiber (acid-detergent-fiber). This meal can be used as a source of polyols in the manufacture of polyurethane products, as outlined in Canadian Patent No. 1,145,899 (1983).

The oil has been examined and found to be of high quality. In particular it has a low content of green pigments, a low sulfur and a low phosphorus content.

The following Examples illustrate further aspects of the invention.

EXAMPLE 1

Canola Separation Using Two Eight-Unit Countercurrent Cascade Cyclone Systems

Whole canola seed was ground in hexane in one pass using an in-line macerator which included a combination of coarse, medium and fine macerating elements (generators). A typical proximate analysis of the resulting ground seed is provided in Table 3.

TABLE 3

Dry matter composition of ground whole canola feed material used in prototype system development program[1]; (Canola breeding seed stock FRI-72-5/S69-914)

| Component | Feed Material |
|---|---|
| Protein | 43.4 |
| A.D.F.[2] | 29.3 |
| N.F.E.[3] | 19.7 |

TABLE 3-continued

Dry matter composition of ground whole canola feed material used in prototype system development program[1]; (Canola breeding seed stock FRI-72-5/S69-914)

| Component | Feed Material |
|---|---|
| Ash | 7.6 |

[1]oil-free, moisture-free values reported
[2]A.D.F. denotes acid-detergent-fiber
[3]N.F.E. denotes nitrogen-free extract.

Figure 2:
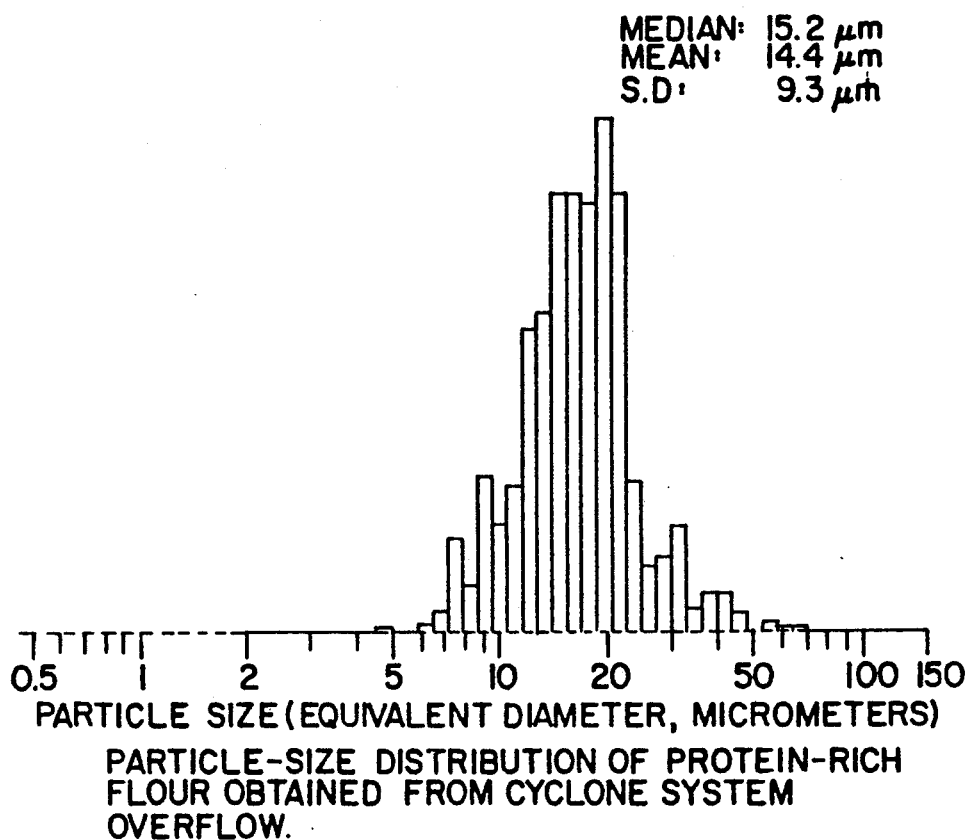
FIG. 2 is a histogram of the protein-rich flour particle size distribution (as from Example 1).
Figure 4:
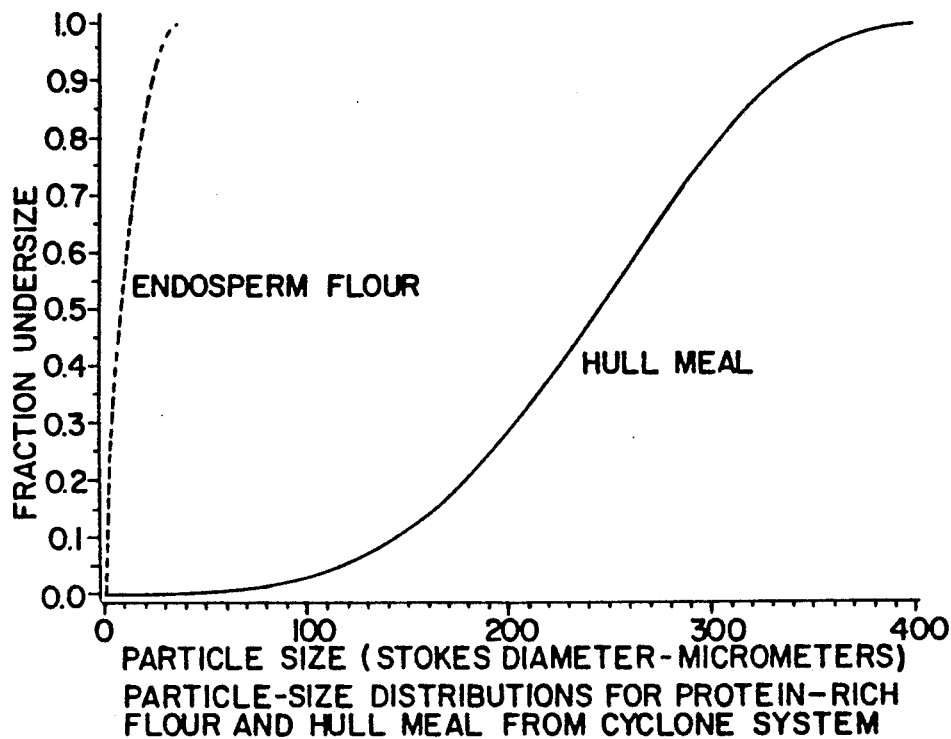
FIG. 4 is a graph depicting the particle size distributions of canola endosperm flour and hull meal after wet macerating.

The resulting solids consisted of a protein-rich (endosperm) flour and a fiber-rich (hull) meal having particle size distributions as shown in FIGS. 2 and 4. The meal was found to be of larger particle size and greater density than the flour.

The selected cyclone separation system consisted of two cascade series stages, the first including eight cyclones (FIG. 5) for countercurrent leaching (extraction), and the second incorporating eight cyclones (FIG. 6) for separating the protein-rich flour and fiber-rich hull materials from each other utilizing a slurry (of about 10 wt.% solids content) consisting of the finely divided macerated whole seed in hexane.

The selected dimensions for these cyclones are provided in Table 4.

TABLE 4

Figure 5:
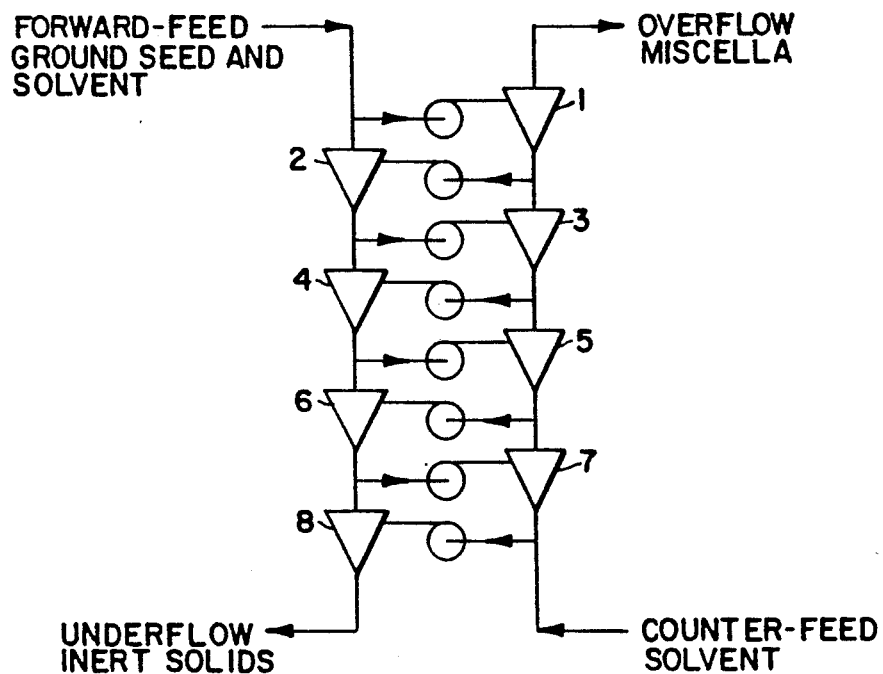
FIG. 5 is a flow diagram of a continuous countercurrent cascade of liquid cyclones tuned for oil separation from solids i.e. solid-liquid separation (e.g. 7 in FIG. 1).
Figure 6:
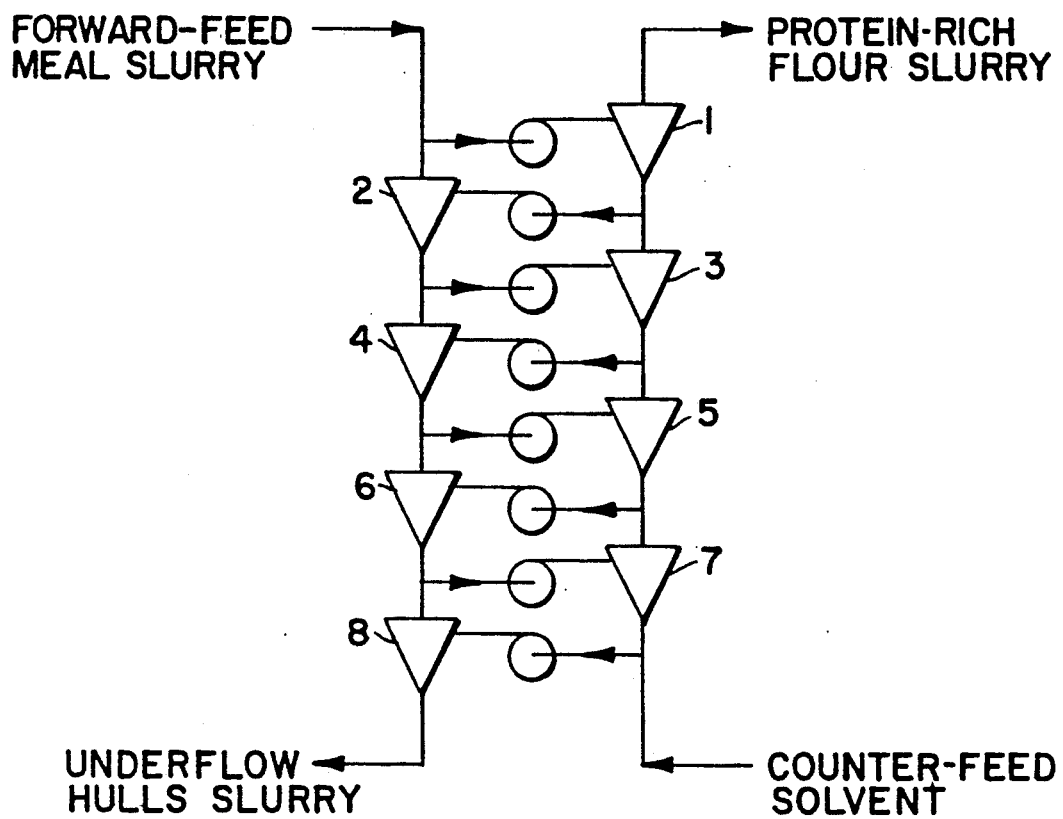
FIG. 6 is a flow diagram of a continuous countercurrent cascade of liquid cyclones tuned for protein-rich flour separation from fiber-rich meal (hulls) i.e. solid-solid separation or solid classification (e.g. 10 in FIG. 1).

Design characteristics of cyclones in cascade series used for both leaching (FIG. 5) and particle classification (FIG. 6)

| Dimension | Selected Value | Units |
|---|---|---|
| Feed inlet area | 0.698 | cm$^2$ |
| Vortex finder radius, outer | 1.89 | cm |
| Vortex finder radius, inner | 1.17 | cm |
| Hydrocyclone radius | 3.00 | cm |
| Apex-vortex finder length | 31.16 | cm |
| Semi-angle of cone | 0.096 | radians |
| Semi-angle of cone | 5.50 | degrees |

The selection of these cyclone dimensions was guided by published cyclone designs, especially Reitema's (Performance and design of hydrocyclones, Parts I to IV, Chemical Engineering Science 15: 298–325, 1961) optimum design for separation, and was tested initially using a specially developed computer model based mainly on the numerical method of Bloor and Ingham (On the efficiency of the industrial cyclone, Trans. Inst'n. Chem. Eng'rs. 51: 173–176, 1973). Optimum dimensions for separation of both the meats and hulls particles were considered to be of primary importance for the extraction process, and computer analysis of the countercurrent system showed that a cyclone having the dimensions shown in Table 4 would also be acceptable for classification.

Referring to FIGS. 1 and 5, countercurrent oil extraction was accomplished by pumping the slurry, having a flowrate of 4.57 kg/min, into the slurry feed inlet of the system (near #1 cyclone, FIG. 1 System 7, and FIG. 5), and by pumping pure hexane solvent, at a flowrate of 2.86 kg/min into the solvent (wash) entry location of the system (near #8 cyclone FIG. 5). Virtually all of the meal solids entering the cyclone extraction system were discharged from the underflow outlet of the number 8 cyclone (FIG. 5), together with hexane solvent and a small quantity of residual oil. Miscella, containing 98.7% of the oil originally present in the feed solids, discharged from the system overflow outlet (#1 cyclone, FIG. 5). The calculated flowrate distribution of oil and solvent present in the miscella phase, and that present in the solids phase throughout the series of eight extraction cyclones is presented in Table 5. This data was obtained by fitting actual process measurements to corresponding variables in the computer model, mentioned previously. Solute and solvent flowrates for the number 1 cyclone feed and overflow streams and for the number 8 cyclone underflow stream are from direct experimental measurement, whereas the rates provided in Table 5 for each of the remaining (intermediate) cyclones were calculated values based on precise mass balances and the known flow splits for each cyclone. From this data it was evident that oil becomes successively more concentrated in the counter-flow direction, with the greater concentration occurring in the overflow stream of the first cyclone, while the absolute flowrate of solute (oil) are actually greatest in the overflow of the number 2 cyclone.

TABLE 5

Flowrate distribution of solvent (hexane) and solute (canola oil) in multistage cyclone extraction system obtained by fitting experimental data to engineering model.

| Cyclone No. | Fl[1] Ratio | Fa[1] Ratio | Solvent Mass Flows (g/min) | | | Solute Mass Flows (g/min) | | |
|---|---|---|---|---|---|---|---|---|
| | | | Feed | Over | Under | Feed | Over[2] | Under[3] |
| 1 | 0.53 | 0.51 | 10,562 | 4,973 | 5,588 | 667 | 329 | 338 |
| 2 | 0.48 | 0.46 | 13,053 | 6,824 | 6,229 | 615 | 334 | 281 |
| 3 | 0.44 | 0.42 | 13,239 | 7,464 | 5,774 | 476 | 277 | 199 |
| 4 | 0.40 | 0.39 | 11,751 | 7,010 | 4,741 | 317 | 194 | 123 |
| 5 | 0.38 | 0.36 | 9,602 | 5,976 | 3,626 | 185 | 118 | 67 |
| 6 | 0.36 | 0.34 | 7,567 | 4,861 | 2,706 | 95 | 63 | 33 |
| 7 | 0.34 | 0.33 | 5,994 | 3,942 | 2,053 | 42 | 28 | 14 |
| 8 | 0.33 | 0.32 | 4,913 | 3,288 | 1,625 | 14 | 9 | 4 |

[1]Fl denotes intrinsic liquid underflow-to-throughput ratio. Fa denotes estimated solute underflow-to-throughput ratio.
[2]Solute in system overflow stream, free of solids phase.
[3]Solute passed to underflow stream with solids and solvent.

The mixture of 99% defatted meal and solvent discharging from the first (extraction) series of cyclones was pumped into the second series of solids-classification cyclones. Distribution and final separation of the flour and hull fractions within the second cyclone system took place according to the calculated flowrate distributions presented in Table 6. Approximately 95% of the hull material from the feed was discharged from the underflow outlet of the number 8 (classification FIG. 6) cyclone, with the 5% balance being discharged from the overflow outlet of the number 1 cyclone as fine particles under about 30 microns in diameter. Also, an estimated minimum of 66% of the original protein-rich flour from the feed stream was discharged from the number 1 cyclone overflow outlet, resulting in the production of an overflow flour having a protein concentration (oil-free, dry basis) of 57% and a crude-fiber content of 7%. Approximately 1.3% of the oil present in the fresh canola feed material was carried in this overflow solvent stream together with the concentrated protein flour, this fraction may be almost fully recovered from the solvent following separation of the flour particles from this solvent mixture. This additional extraction would allow a net oil separation of 99.9% of the original oil. The classification process (FIG. 6) effectively upgraded the meal from a protein/fiber ratio of 1.5 (whole seed) to a value of 8.6 (overflow flour) while producing a secondary meal having a fiber concentration of 46%, and a protein/fiber ratio of only 0.7. In Table 7 is given the flowrates for each component of canola in the process at the two feed entrances (not including recycle contributions) and two discharge outlets of the classification system (FIG. 6). Summary data on the effectiveness of the particle separation process is provided in Table 8. The process effectively provided a flour (overflow solids 23 in FIG. 1) with a high protein/fiber ratio and a high meats/hulls ratio. Both the hulls and fiber contents of this flour were below about 7%.

TABLE 6

Characteristic flowrate distributions of hull particles, endosperm (meats) particles, and total materials in countercurrent cyclone flow network obtained by fitting experimental data to engineering model.

A. Hull Particles:

| Cyclone No. | Concentrations (normalized)[1] | | | Mass flowrate (grams/second) | | |
| --- | --- | --- | --- | --- | --- | --- |
| | FEED | OVER | UNDER | FEED | OVER | UNDER |
| 1 | 0.36 | 0.04 | 0.65 | 3.55 | 0.18 | 3.37 |
| 2 | 0.29 | 0.02 | 0.59 | 3.51 | 0.13 | 3.38 |
| 3 | 0.29 | 0.02 | 0.65 | 3.58 | 0.14 | 3.44 |
| 4 | 0.34 | 0.03 | 0.83 | 3.74 | 0.20 | 3.54 |
| 5 | 0.45 | 0.05 | 1.16 | 3.98 | 0.30 | 3.68 |
| 6 | 0.62 | 0.10 | 1.65 | 4.23 | 0.44 | 3.79 |
| 7 | 0.81 | 0.15 | 2.24 | 4.29 | 0.55 | 3.74 |
| 8 | 0.87 | 0.17 | 2.57 | 3.74 | 0.50 | 3.24 |

[1]normalized relative to feed slurry concentration = 1

B. Flour (meats) Particles:

| Cyclone No. | Concentrations (normalized) | | | Mass Flows (grams/second) | | |
| --- | --- | --- | --- | --- | --- | --- |
| | FEED | OVER | UNDER | FEED | OVER | UNDER |
| 1 | 0.43 | 0.47 | 0.38 | 6.33 | 3.39 | 2.40 |
| 2 | 0.22 | 0.12 | 0.32 | 3.96 | 1.21 | 2.76 |
| 3 | 0.21 | 0.10 | 0.37 | 3.96 | 1.03 | 2.94 |
| 4 | 0.27 | 0.12 | 0.51 | 4.45 | 1.21 | 3.24 |
| 5 | 0.38 | 0.18 | 0.73 | 4.96 | 1.51 | 3.45 |
| 6 | 0.49 | 0.25 | 0.97 | 5.05 | 1.72 | 3.33 |
| 7 | 0.55 | 0.29 | 1.11 | 4.36 | 1.60 | 2.76 |
| 8 | 0.43 | 0.23 | 0.92 | 2.76 | 1.03 | 1.73 |

TABLE 6-continued

Characteristic flowrate distributions of hull particles, endosperm (meats) particles, and total materials in countercurrent cyclone flow network obtained by fitting experimental data to engineering model.

C. Flow distribution of solvent plus total solids:

| Cyclone No. | Fs Ratio[1] | Volume flowrates (ml/s) | | | Mass Flows (g/s) | | |
| --- | --- | --- | --- | --- | --- | --- | --- |
| | | FEED | OVER | UNDER | FEEL | OVER | UNDER |
| 1 | 0.53 | 291 | 138 | 153 | 191 | 91 | 100 |
| 2 | 0.48 | 352 | 183 | 169 | 231 | 120 | 111 |
| 3 | 0.44 | 355 | 199 | 156 | 233 | 130 | 102 |
| 4 | 0.41 | 315 | 186 | 129 | 206 | 122 | 84 |
| 5 | 0.38 | 258 | 159 | 99 | 169 | 104 | 65 |
| 6 | 0.37 | 204 | 129 | 74 | 134 | 85 | 49 |
| 7 | 0.35 | 161 | 105 | 56 | 106 | 69 | 37 |
| 8 | 0.33 | 129 | 86 | 43 | 85 | 57 | 28 |

[1]Fs denotes slurry underflow to throughput (cyclone feed) ratio for the indicated cyclone.

EXAMPLE 2

Canola Separation Using One Twelve-Unit Countercurrent Cascade Cyclone System Plus Two Auxiliary Cyclone Stages (FIG. 7)

As in Example 1, whole canola seed 18 (Table 3) was ground in hexane in an enclosed flow-through system, 3, 4 and 5, resulting in a slurry consisting of protein-rich (endosperm) flour and fiber-rich (hull) meal, and miscella. The cyclone portion of the system (FIG. 7) consisted of three stages 7, 8 and 10. The first stage 7 included twelve cyclones 14 used for countercurrent cascade leaching (extraction) with simultaneous separation of the protein-rich flour and fiber-rich hull materials from each other within a feed slurry consisting of 4.38 parts hexane to one part of finely divided whole seed. Two additional stages, 8 and 10, consisting of one or more (in parallel) cyclone(s) 14, were located at the two outlet locations of the first cascade stage. One of these stages 10 was used to partially desolventize or concentrate the underflow slurry discharge comprising solvent and fiber-rich meal 26; the other 8 was used to remove a major portion of the miscella 20 from the overflow slurry discharge stream comprising oil, solvent, and protein-rich flour. Further separation of miscella and solvent from each of the cascade overflow and underflow slurries, respectively, was accomplished by centrifugation using totally enclosed decanter type centrifuges. Counter-current oil extraction proceeded by pumping the slurry, having a flowrate of 4.95 kg/min, into the slurry feed inlet of the cascade system (before #1 cyclone FIG. 7), and by pumping pure hexane solvent, at a flowrate of 4.06 kg/min into the solvent (wash) entry location of the cascade system (before #12 cyclone FIG.7).

TABLE 7

Experimental input and output stream mass flowrates for canola components and solvent in 8-unit classification cyclone system.

| | Flowrate (grams/minute) | | | | | | |
| --- | --- | --- | --- | --- | --- | --- | --- |
| | MOIST. | PROTEIN | ASH | FAT | FIBER | N.F.E. | SOLVENT |
| FORWARDFLOW[1] | 39.6 | 199.3 | 35.2 | 4.4 | 134.6 | 90.6 | 3888.7 |
| COUNTERFLOW[2] | | | | | | | 2860.0 |
| OVERFLOW[3] | 13.6 | 109.3 | 15.0 | 3.0 | 12.7 | 54.6 | 5302.4 |

TABLE 7-continued

Experimental input and output stream mass flowrates for canola components and solvent in 8-unit classification cyclone system.

| | Flowrate (grams/minute) | | | | | |
|---|---|---|---|---|---|---|
| | MOIST. | PROTEIN | ASH | FAT | FIBER | N.F.E. | SOLVENT |
| UNDERFLOW[4] | 26.0 | 90.0 | 20.2 | 1.4 | 121.9 | 36.0 | 1446.3 |

[1]Forwardflow feed inlet before #1 cyclone;
[2]Counterflow feed inlet before #8 cyclone;
[3]Overflow outlet from #1 cyclone;
[4]Underflow outlet from #8 cyclone.
MOIST. = moisture; N.F.E. = nitrogen-free extract
Flowrates do not include recycle streams from adjacent cyclones. Fat shown is residual following countercurrent leaching.

TABLE 8

Summary of characteristics of whole and separated Canola meal fractions from experimental analysis.

| Characteristic | Feed Canola Meal | Overflow Solids | Underflow Solids |
|---|---|---|---|
| Protein concentration[1] (%) | 43.4 | 57.1 | 33.6 |
| Fiber concentration[1] (%) | 29.3 | 6.6 | 45.5 |
| Protein/Fiber ratio | 1.5 | 8.6 | 0.7 |
| Hull material (%) | 40.1 | 5.0 | 65.2 |
| Meats material (%) | 59.9 | 95.0 | 34.8 |
| Meats/Hulls ratio | 1.5 | 19.2 | 0.5 |

[1]Concentrations based on oil-free, moisture-free basis.

The dimensions of the cyclones used in all three stages were the same as in Example 1 (Table 4). The selection of the feed flowrate, counterflow solvent flow rate, slurry solids content, and number of stages was carried out by trial-and-error.

Tests confirmed that separation of the flour and hull fractions within this cascade cyclone system took place according to the calculated flowrate distributions presented in Table 9. Approximately 96% of the hull material in the feed was discharged to the underflow outlet of the number 12 cyclone, with the 4% balance being discharged to the overflow outlet of the number 1 cyclone as fine particles under about 30 microns in diameter. Also, 61% of the original endosperm (meats) flour in the feed stream was discharged to the number 1 cyclone overflow outlet, resulting in the production of an overflow flour having a protein concentration (dry basis) of 58% and a fiber concentration of less than 6%. More than 99% of the oil originally present in the fresh canola feed material 18 was discharged in the overflow stream miscella, together with the flour. Table 10 shows the estimated distribution of the solute and solvent in this 12-cyclone network.

The solids classification process effectively upgraded the meal from a protein/fiber ratio of 1.5 (fresh seed) to a value of 10.2 (overflow flour) while producing a secondary or waste material having a fiber concentration of 44%, and a protein/fiber ratio of only 0.8. Table 11 gives the flow rate distribution for each component of canola in the process at the two feed entrances (not including recycle contributions) and two discharge outlets of the classification system. Table 12 provides a summary of characteristics of the input and discharge streams to this multi-cyclone system.

TABLE 9

Characteristic flowrate distributions of hull particles, endosperm (meats) particles, and total materials in countercurrent cyclone flow network for simultaneous particle separation and oil extraction.

A. Hull Particles:

| Cyclone No. | Concentrations (normalized) | | | Mass Flows (grams/second) | | |
|---|---|---|---|---|---|---|
| | FEED | OVER | UNDER | FEED | OVER | UNDER |
| 1 | 0.30 | 0.02 | 0.56 | 3.80 | 0.14 | 3.66 |
| 2 | 0.22 | 0.01 | 0.44 | 3.74 | 0.09 | 3.66 |
| 3 | 0.20 | 0.01 | 0.42 | 3.76 | 0.08 | 3.67 |
| 4 | 0.20 | 0.01 | 0.46 | 3.82 | 0.10 | 3.72 |
| 5 | 0.23 | 0.01 | 0.56 | 3.94 | 0.15 | 3.80 |
| 6 | 0.29 | 0.02 | 0.72 | 4.13 | 0.22 | 3.90 |
| 7 | 0.37 | 0.04 | 0.95 | 4.35 | 0.33 | 4.02 |
| 8 | 0.47 | 0.07 | 1.25 | 4.56 | 0.45 | 4.11 |
| 9 | 0.58 | 0.10 | 1.59 | 4.69 | 0.54 | 4.15 |
| 10 | 0.68 | 0.12 | 1.97 | 4.71 | 0.58 | 4.12 |
| 11 | 0.75 | 0.13 | 2.31 | 4.53 | 0.55 | 3.98 |
| 12 | 0.73 | 0.10 | 2.41 | 3.98 | 0.40 | 3.57 |

B. Flour (meats) particles:

| Cyclone No. | Concentrations (normalized) | | | Mass Flows (grams/second) | | |
|---|---|---|---|---|---|---|
| | FEED | OVER | UNDER | FEED | OVER | UNDER |
| 1 | 0.35 | 0.38 | 0.33 | 6.61 | 3.40 | 3.21 |
| 2 | 0.16 | 0.08 | 0.24 | 4.03 | 1.05 | 2.98 |
| 3 | 0.14 | 0.05 | 0.24 | 3.97 | 0.82 | 3.14 |
| 4 | 0.16 | 0.06 | 0.30 | 4.58 | 0.99 | 3.59 |
| 5 | 0.22 | 0.09 | 0.42 | 5.70 | 1.43 | 4.26 |
| 6 | 0.33 | 0.16 | 0.61 | 7.08 | 2.11 | 4.97 |
| 7 | 0.46 | 0.25 | 0.86 | 8.24 | 2.82 | 5.42 |
| 8 | 0.60 | 0.34 | 1.10 | 8.70 | 3.27 | 5.43 |
| 9 | 0.68 | 0.40 | 1.28 | 8.28 | 3.28 | 5.01 |
| 10 | 0.69 | 0.39 | 1.36 | 7.13 | 2.85 | 4.28 |
| 11 | 0.60 | 0.33 | 1.29 | 5.45 | 2.12 | 3.33 |
| 12 | 0.41 | 0.20 | 0.97 | 3.33 | 1.17 | 2.15 |

C. Flow distribution of solvent plus total solids:

| Cyclone No. | Fs Ratio | Volume flowrate (ml/s) | | | Mass Flows[1] (g/s) | | |
|---|---|---|---|---|---|---|---|
| | | FEED | OVER | UNDER | FEED | OVER | UNDER |
| 1 | 0.53 | 356 | 167 | 189 | 238 | 112 | 126 |
| 2 | 0.49 | 481 | 244 | 237 | 318 | 161 | 157 |
| 3 | 0.46 | 540 | 292 | 248 | 357 | 192 | 165 |
| 4 | 0.43 | 534 | 304 | 230 | 353 | 200 | 153 |
| 5 | 0.41 | 482 | 286 | 196 | 320 | 188 | 132 |
| 6 | 0.39 | 411 | 252 | 159 | 274 | 166 | 108 |
| 7 | 0.38 | 341 | 215 | 126 | 229 | 143 | 86 |
| 8 | 0.36 | 283 | 182 | 101 | 191 | 121 | 70 |
| 9 | 0.35 | 238 | 156 | 82 | 161 | 104 | 57 |
| 10 | 0.34 | 204 | 137 | 67 | 138 | 92 | 47 |
| 11 | 0.32 | 178 | 122 | 55 | 120 | 81 | 39 |
| 12 | 0.31 | 159 | 111 | 48 | 106 | 74 | 33 |

[1]extracted oil not included; see Table 10

TABLE 10

Flow rate distribution of solvent (hexane) and solute (canola oil) in 12-unit multistage cyclone system.

| Cyclone No. | Fl Ratio | Fa Ratio | Solvent Mass Flows (g/min) | | | Solute Mass Flows (g/min) | | |
|---|---|---|---|---|---|---|---|---|
| | | | Feed | Over | Under | Feed | Over | Under |
| 1 | 0.53 | 0.51 | 13,335 | 6,237 | 7,097 | 679 | 333 | 346 |
| 2 | 0.49 | 0.47 | 18,275 | 9,277 | 8,998 | 655 | 346 | 309 |
| 3 | 0.46 | 0.44 | 20,662 | 11,177 | 9,485 | 551 | 309 | 242 |
| 4 | 0.43 | 0.41 | 20,491 | 11,665 | 8,826 | 412 | 242 | 170 |
| 5 | 0.41 | 0.39 | 18,544 | 11,006 | 7,539 | 278 | 170 | 108 |
| 6 | 0.39 | 0.37 | 15,824 | 9,719 | 6,106 | 171 | 108 | 63 |
| 7 | 0.37 | 0.35 | 13,116 | 8,286 | 4,830 | 97 | 63 | 34 |
| 8 | 0.35 | 0.34 | 10,840 | 7,010 | 3,830 | 51 | 34 | 17 |
| 9 | 0.34 | 0.33 | 9,112 | 6,010 | 3,102 | 25 | 17 | 8 |
| 10 | 0.32 | 0.31 | 7,823 | 5,282 | 2,541 | 11 | 8 | 4 |
| 11 | 0.31 | 0.30 | 6,857 | 4,721 | 2,136 | 5 | 3 | 1 |
| 12 | 0.30 | 0.29 | 6,194 | 4,316 | 1,878 | 1 | 1 | 0 |

1. Fl denotes intrinsic liquid underflow-to-throughput ratio. Fa denotes estimated solute underflow-to-throughput ratio.
2. Solute in system overflow stream, free of solids phase.
3. Solute passed to underflow stream with solids and solvent.

TABLE 11

Input and output stream mass flowrates for canola solids components and solvent in classification-leaching cyclone system comprising twelve (12) cyclones.

| | Flowrate (grams/minute) | | | | | | |
|---|---|---|---|---|---|---|---|
| | MOIST. | PROTEIN | ASH | FAT | FIBER | N.F.E. | SOLVENT |
| FORWARDFLOW[1] | 43.3 | 220.9 | 38.2 | 12.8 | 141.6 | 99.3 | 4057.9 |
| COUNTERFLOW[2] | | | | | | | 4057.9 |
| OVERFLOW[3] | 14.3 | 116.2 | 15.4 | 6.5 | 11.4 | 58.9 | 6492.5 |
| UNDERFLOW[4] | 29.0 | 104.7 | 22.8 | 6.3 | 130.2 | 40.4 | 1623.3 |

[1] Forwardflow feed inlet before #1 cyclone;
[2] Counterflow feed inlet before #12 cyclone;
[3] Overflow outlet from #1 cyclone;
[4] Underflow outlet from #12 cyclone.
MOIST. = moisture; N.F.E. = nitrogen-free extract
Flowrates do not include recycle streams from adjacent cyclones. Fat shown is residual in meals.

TABLE 12

Summary of canola meal characteristics from feed, overflow and underflow streams of 12-cyclone extraction-classification system.

| Characteristic | Feed Canola Meal | Overflow Solids | Underflow Solids |
|---|---|---|---|
| Protein concentration[1] | 43.4 | 57.6 | 35.1 |
| Fiber concentration[1] | 29.3 | 5.6 | 43.7 |
| Protein/Fiber ratio | 1.5 | 10.2 | 0.8 |
| Hulls material (%) | 40.1 | 3.7 | 61.3 |
| Meats material (%) | 59.9 | 96.3 | 38.7 |
| Meats/Hulls ratio | 1.49 | 26.0 | 0.63 |

[1] Concentrations calculated on oil-free, moisture-free basis.

We claim:

1. A process for separating oilseeds into high quality oil and protein-rich flour components, and a fibrous seed coat meal component, comprising:
   (a) slurrying intact clean oilseeds with a non-aqueous solvent which is a solvent for the oil but not for the protein and other solids present in the oilseeds,
   (b) macerating the oilseeds in the slurry to powder form and dissolving the oil in the solvent;
   (c) passing the macerated slurry to at least two stages of liquid cyclone separators with at least one stage being a cascade series, the initial stage being selected so that the overflow becomes concentrated in one of the oil miscella or the oil miscella plus protein-rich flour; while the underflow becomes concentrated in one of: protein-rich flour plus fiber-rich seed coat meal, when the overflow is concentrated in oil miscella, or fiber-rich seed coat meal, when the overflow is concentrated in oil miscella plus protein-rich flour,
   (d) passing the underflow from the initial cyclone stage (c) to a second liquid cyclone separator stage, said second stage being selected so that the overflow becomes concentrated in the protein-rich flour when present or in solvent when the flour is absent; while the underflow becomes concentrated in the fiber-rich seed coat meal,
   (e) passing the overflow from (c) to one of the following stages i) when protein-rich flour is present, a third liquid cyclone separator stage selected so that the overflow will become concentrated in oil miscella and the underflow in protein-rich flour, and ii) when protein-rich flour is absent, an oil-solvent separation stage, and
   (f) recovering oil from the miscella overflow from (e)i) or from said separation state (e)ii); protein-rich flour from the overflow from (d) or the underflow from (e)i); and seed coat meal from the underflow from (d).

2. A process for separating oilseeds into high quality oil, and protein-rich flour components, and a fibrous seed coat meal component, comprising:
   (a) slurrying intact clean oilseeds with a nonaqueous solvent which is a solvent for the oil but not for the protein and other solids present in the oilseeds,
   (b) macerating the oilseeds in the slurry to powder form and dissolving the oil in the solvent,
   (c) passing the macerated slurry to a primary cascade series of liquid cyclone separators selected so that the seed meat and seed coat fragments become concentrated in the series underflow outlet stream while the oil concentration of the oil-solvent miscella is increased in the primary series overflow outlet stream, with additional solvent entering into the system countercurrently from the last cyclone inlet of the primary cyclone series, (d) passing the underflow slurry containing seed meat and seed coat particles to a secondary cascade series of liquid cyclone separators selected so that the slurry becomes concentrated with seed coat meal in the underflow stream of this series and concentrated with protein-rich seed meat flour in the overflow stream of this series, with additional solvent entering into the system countercurrently from the last cyclone inlet of the secondary series of cyclones, (e) recovering oil and solvent from the miscella of the primary series overflow, fiber-rich meal from the secondary series final underflow, protein-rich flour from the secondary series overflow, and solvent from each of said two overflows and said final underflow, and (f) recycling solvent to at least one of steps (a), (c) and (d).

3. A process for separating oilseeds into high quality oil and protein-rich flour components, and a fibrous seed coat meal component, comprising:

(a) slurrying intact clean oilseeds with a nonaqueous solvent which is a solvent for the oil but not for the protein and other solids present in the oilseeds, (b) macerating the oilseeds in the slurry to powder form and dissolving the oil in the solvent, (c) passing the macerated slurry to a cascade series of liquid cyclone separators as first stage selected so that the oil miscella and protein-rich flour become concentrated in the overflow stream, while the fibrous seed coat solids become enriched in the underflow stream, with additional solvent entering countercurrently from the last cyclone inlet, (d) passing the overflow stream to a second liquid cyclone separator stage selected so that a major portion of the oil miscella becomes separated as overflow from the protein-rich flour, (e) passing the underflow stream from (c) to a third liquid cyclone separator stage selected so that a major portion of the solvent becomes separated as overflow from the fibrous seed coat meal, (f) separating additional oil miscella from the protein-rich flour from (d), and additional solvent from the fibrous seed coat meal from (e), and, (g) recovering the oil, the protein-rich flour and the fibrous seed coat meal; and solvent for recycling.

4. The process of claim 1 wherein all of said steps are carried out in a substantially closed system on a continuous basis.

5. The process of claim 1 wherein the oilseed is a Brassica species of the canola type.

6. The process of claim 1 wherein the oil recovery includes distillation separations, and the fiber-rich seed coat meal and protein-rich flour recovery includes centrifugal separations.

7. The process of claim 1 wherein the solvents are selected from hydrocarbon liquids, chlorinated hydrocarbon liquids, alcohols, liquid ethers, ketones and mixtures thereof.

8. The process of claim 1 wherein the maceration in step (b) is sufficient to reduce the seed coat particles to smaller than about 35 mesh.

9. The process of claim 1 wherein the solids content of the slurry formed in step (a) is from about 5 to about 15% by wt.

10. The process of claim 1 wherein the ratio of recycle solvent to total solvent in steps (c) and (d) is from about 0.8 to about 0.98.

11. The process of claim 1 wherein the diameters of the liquid cyclones used to separate miscella or solvent and protein-rich flour from fiber-rich seed coat meal are selected within the range of about 3 to about 10 cm, and the cyclone liquid feed flowrates are chosen to cause high separation efficiencies for the seed coat meal, and low separation efficiencies for the protein-rich flour, with hull particles predominantly flowing to the cyclone underflow exits, and flour or flour plus miscella predominantly flowing to cyclone overflow exits.

12. The process of claim 1 wherein the diameters of the liquid cyclones used to separate miscella from flour and seed coat meal are selected within the range of about 3 to about 10 cm, and the cyclone feed flowrates are chosen to produce high separation efficiencies for both the seed coat and endosperm solids, these predominantly flowing to underflow exits, with miscella flowing to the overflow exits at rates equal to about 50% or more of the cyclone liquid feed flowrate.

13. The process of claim 1 wherein the diameters of the liquid cyclones used to separate protein-rich flour from fiber-rich seed coat meal are selected within the range of about 3 to about 10 cm and the flowrate selected for high separation of flour particles, which predominantly reports to overflow exits, from seed coat particles which report to cyclone underflow exits.

14. The process of claim 1 wherein the characteristics of the liquid cyclone stage used to separate miscella from flour are selected from:

liquid cyclone diameter: 3 to 6 cm flowrate: 150 to 750 ml/sec with the cyclone design and flowrate tuned to optimize separation of miscella as overflow from flour.

15. The process of claim 1 wherein characteristics of the liquid cyclone stage used to separate solvent or miscella from seed coat meal are selected from:

liquid cyclone diameter: 5 to 9 cm flowrate: 150 to 750 ml/sec with the cyclone design and flowrate tuned to optimize separation of solvent or miscella as overflow from seed coat meal.

* * * * *